May 13, 1958 R. A. NORBOM 2,834,495
CONTAINER TRANSFER APPARATUS
Filed Aug. 24, 1954 5 Sheets-Sheet 3
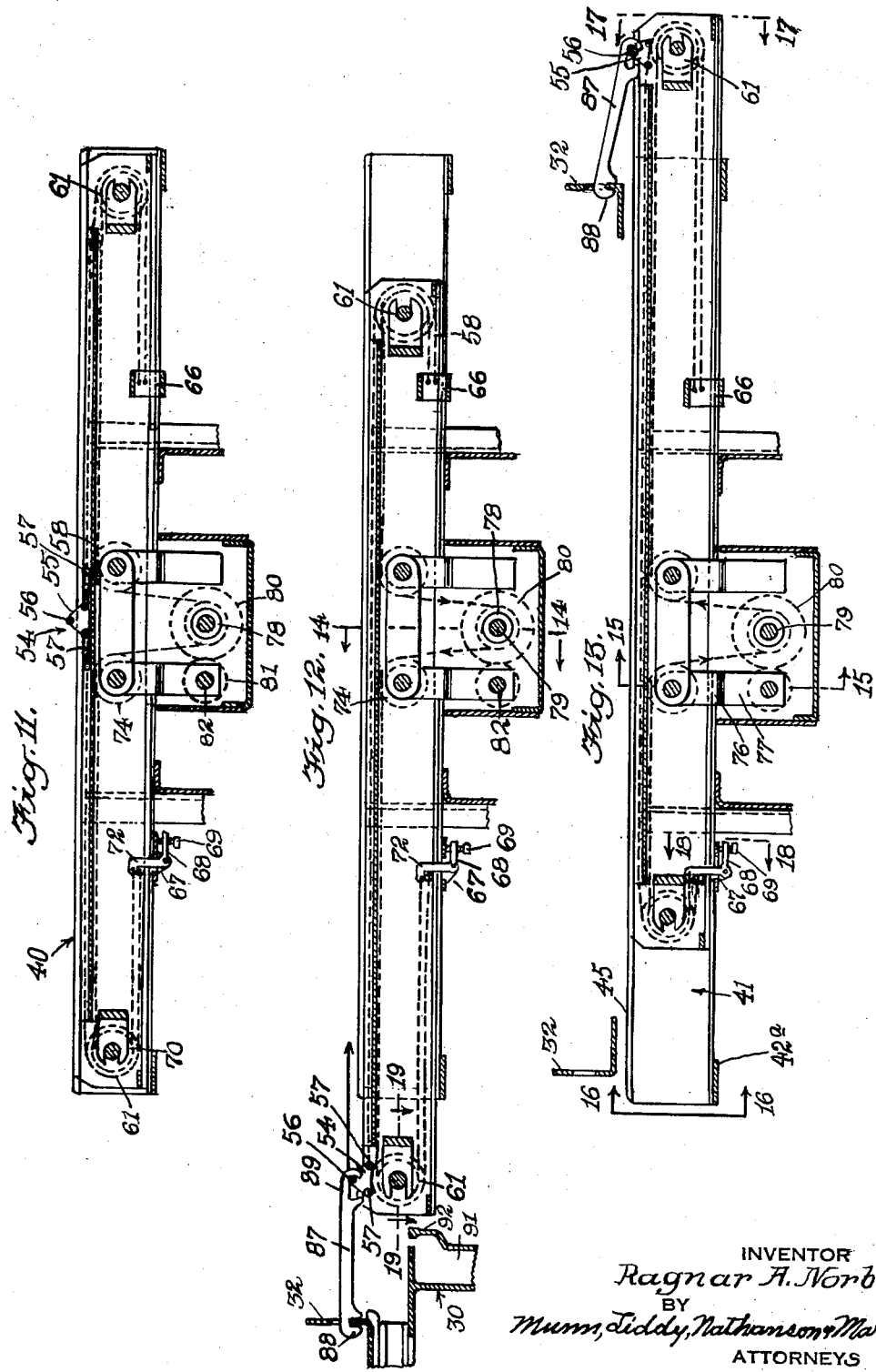
INVENTOR
Ragnar A. Norbom
BY
Munn, Liddy, Nathanson & March
ATTORNEYS

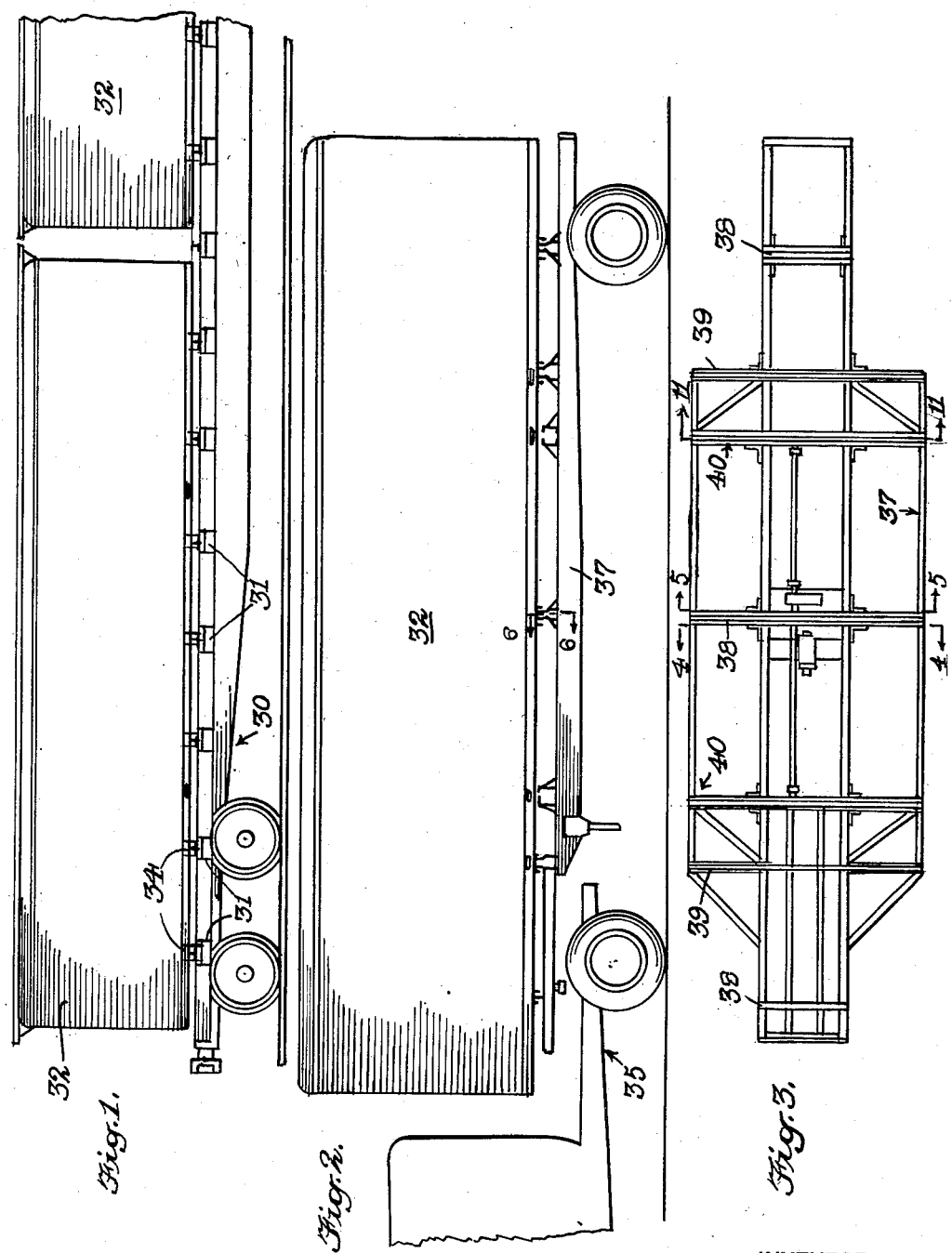

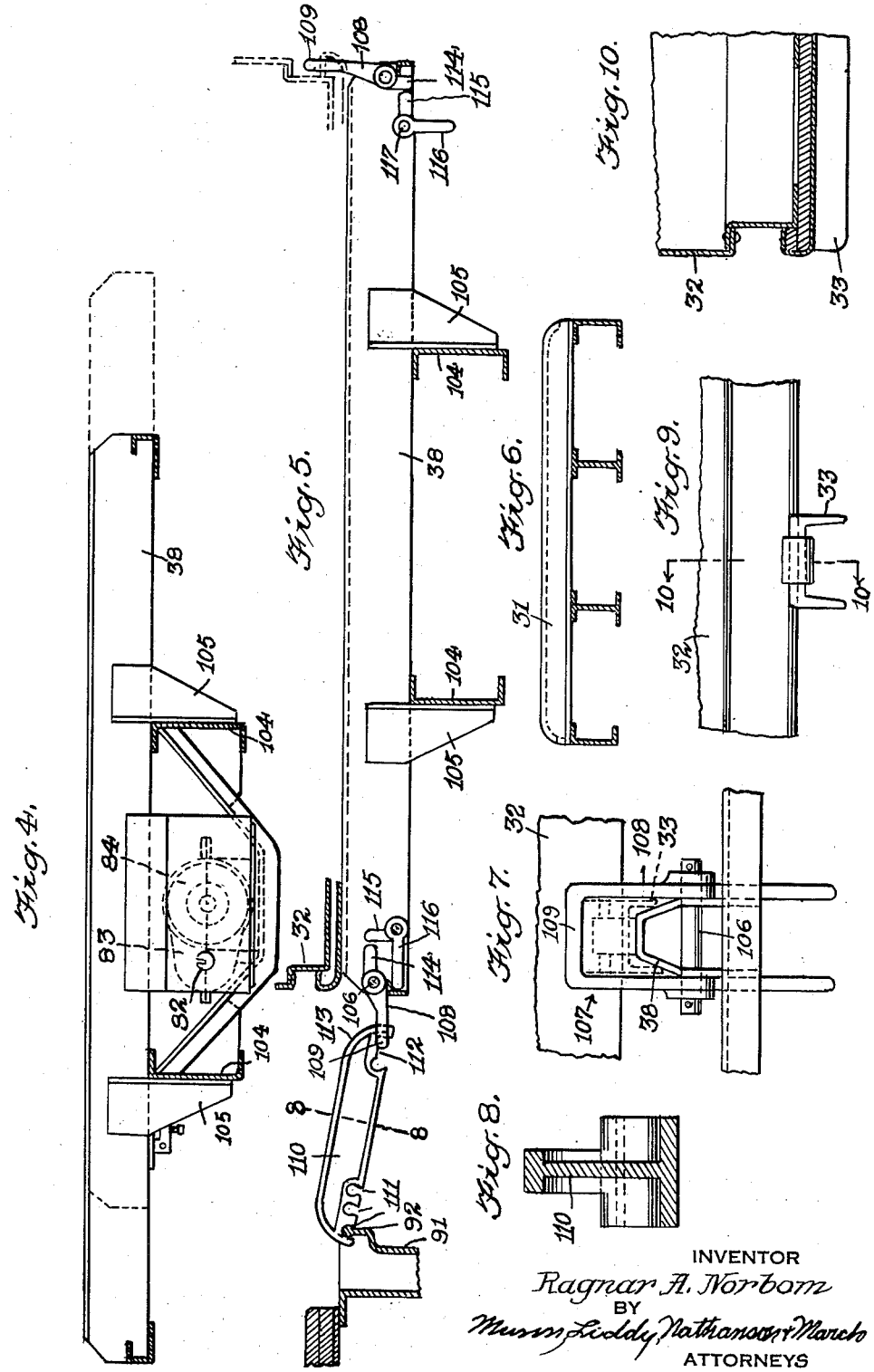

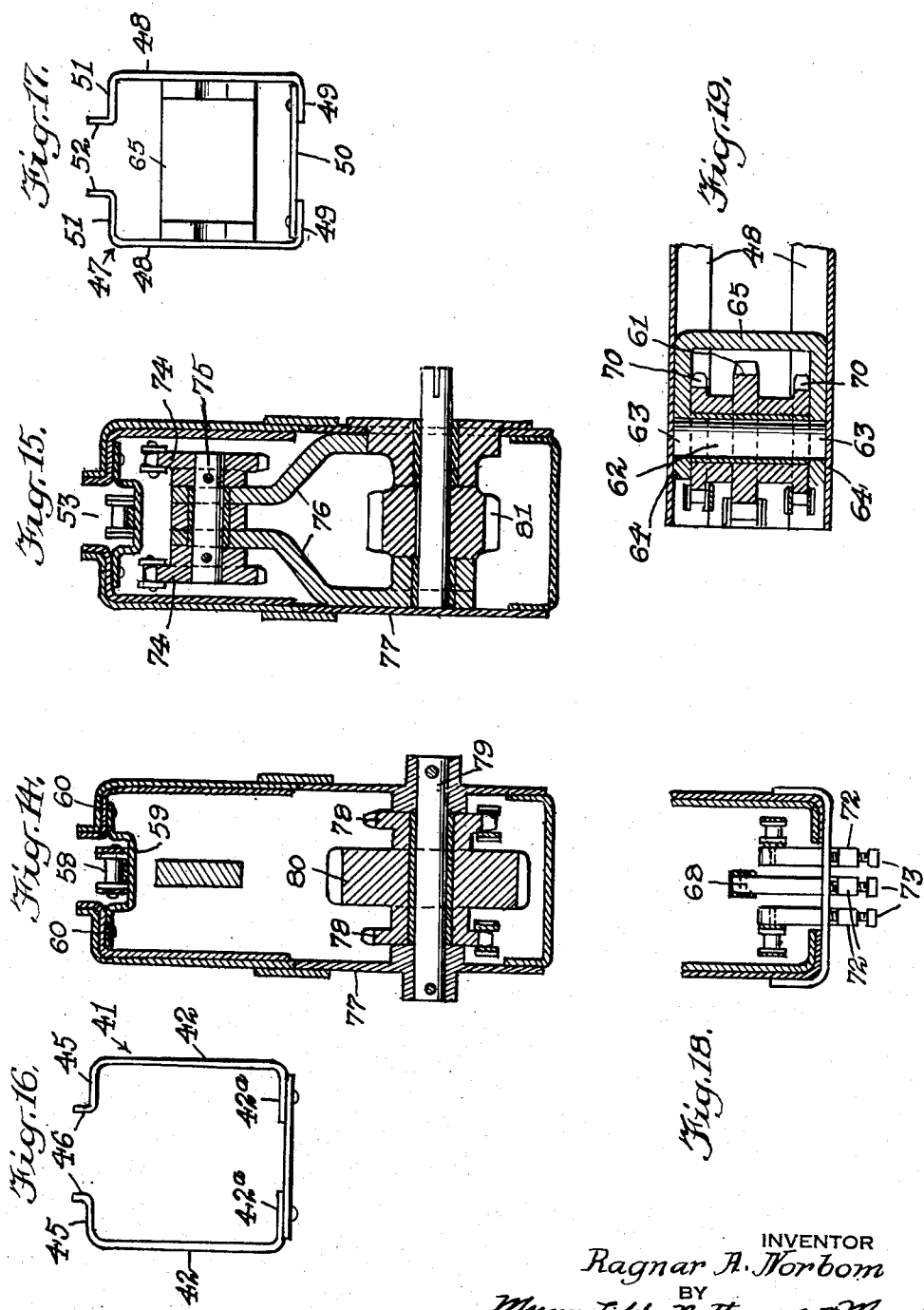

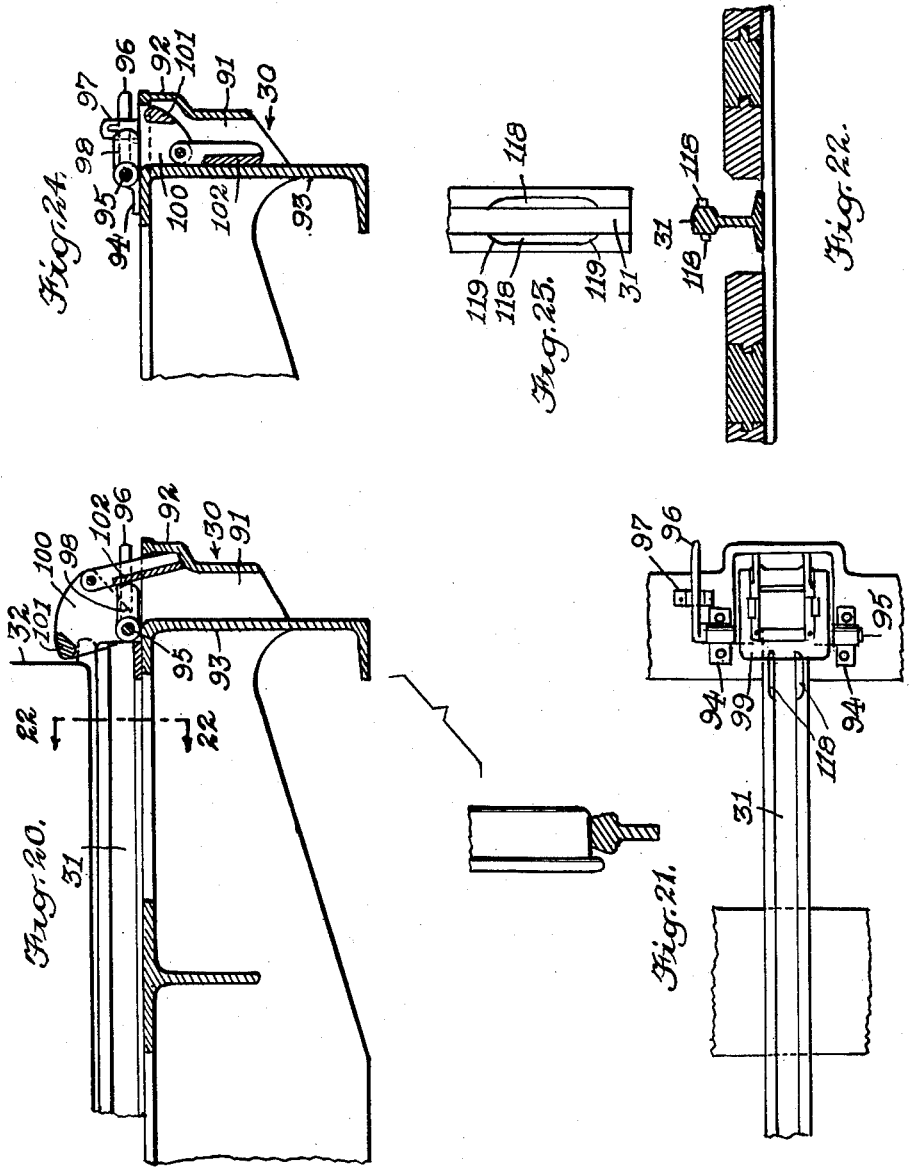

United States Patent Office 2,834,495
Patented May 13, 1958

2,834,495

CONTAINER TRANSFER APPARATUS

Ragnar A. Norbom, Alexandria, Va., assignor to David N. Finnie, doing business as David N. Finnie Associates, New York, N. Y.

Application August 24, 1954, Serial No. 451,857

5 Claims. (Cl. 214—516)

This invention relates to apparatus adapted primarily to be carried by a vehicle for transferring large and heavy freight containers to and from the vehicle.

Containers of the type intended for use in conjunction with the apparatus of the invention include large milk tanks, containers for other food products such as flour, etc. A container of the type involved with the present invention is shown in my Patent No. 2,259,319, dated October 14, 1941, and entitled Demountable Tank Body.

The present invention comprises an improvement in the container transfer equipment described and claimed in my Patent No. 2,348,019, dated May 2, 1944, and entitled Container Transfer Equipment for Vehicles. The apparatus of this invention, and the vehicle with which it is equipped, has various uses, as are brought out in this designated patent. The patent discloses apparatus adapted to be mounted on a vehicle for transferring freight containers to the vehicle from an adjacent platform or support alongside of the vehicle, and vice versa. The platform or support may be that of another vehicle, and, for example, the other vehicle may be a railroad flat car or the like and the one vehicle a truck trailer.

In the patent I provide a number of heavy bar or bridge members which are slidably mounted on the vehicle and are adapted to move laterally thereof from one side to the other, and to project beyond said sides. These members are power-actuated, and I utilize two movements of the members to effect that transfer of the container from an adjacent support to the vehicle, or vice versa. When the member is fully projected from one side of the vehicle, I attach a drag link between the projected end and the container, and then draw the container approximately half way onto the vehicle. I then bring the member back by a reverse movement and connect the drag link to the non-projected or inner end of the member, whereupon the member is again advanced in the initial direction to complete the transfer of the container to the vehicle.

In accordance with the present invention I accomplish the entire transfer of the container from a support to the vehicle and vice versa with but a single movement or operation of the slide member, as distinguished from the plurality of movements, namely advance, reverse and again advance, of the members of my referred to patent.

Accordingly, an object of the invention is to provide an improved apparatus by which large, bulky and heavy containers for freight and the like may be transferred from a platform to a vehicle or vice versa, or from one vehicle to another, with but a single, uni-directional movement of the transfer member or means. The apparatus by which this is accomplished will be described hereinafter in full detail.

Another object of the invention is to provide an improved transfer apparatus as set forth immediately above, which is extremely simple in its construction, and economical to fabricate.

A still further object of the invention is to provide an improved transfer apparatus in accordance with the foregoing, which is relatively small and compact, and light in weight while at the same time being extremely durable and rugged, and reliable in operation under severe and heavy usage.

A feature of the invention is the provision of transfer apparatus as above characterized, which may be readily incorporated in various types of chassis of vehicles, including truck trailers, railroad cars, loading platforms, etc.

Still another object of the invention is to provide improved and simplified, easily-actuated, reliable locking means for securely holding large and heavy containers of the type transferred by the apparatus of this invention in their intended positions on vehicles.

Other features and advantages will hereinafter appear.

In the accompanying drawings:

Figure 1 is a fragmentary side elevational view of a railroad car having a detachable container of the type adapted to be transferred by the apparatus of the invention.

Fig. 2 is a side elevational view of a truck trailer carrying a detachable body of the type shown in Fig. 1 and having the improved transfer apparatus of the present invention.

Fig. 3 is a top or plan view of the chassis framework of the trailer illustrated in Fig. 2, showing the location of the motive means and power transmission for the improved transfer apparatus.

Fig. 4 is a transverse sectional view taken on line 4—4 of Fig. 3.

Fig. 5 is a transverse sectional view taken on line 5—5 of Fig. 3, the view also showing in broken outline a container carried by the trailer and an adjacent portion of the railroad flat car, together with a connecting bridge or track section for the container, linking the railroad car and the truck trailer.

Fig. 6 is a transverse sectional view taken on line 6—6 of Fig. 2.

Fig. 7 is a detail showing in end elevation and locked position, the container locking means carried by the trailer.

Fig. 8 is a transverse sectional view of the connecting bridge member shown in Fig. 5.

Fig. 9 is a fragmentary side elevational view of the lower portion of a container, showing the skid rail thereof.

Fig. 10 is a section taken on line 10—10 of Fig. 9.

Fig. 11 is a transverse sectional view taken on line 11—11 of Fig. 3, showing the transfer rail, transfer slide, and driving mechanism therefor.

Fig. 12 is a view like Fig. 11 but showing the transfer slide and driving mechanism shifted the maximum amount to the left, the driving member being connected to a container preparatory to transferring the container to the trailer.

Fig. 13 is a transverse sectional view like Figs. 11 and 12 but showing the slide and drive mechanism in its rightmost position, with the container completely transferred to the trailer by a single, unidirectional movement of the slide and drive mechanism.

Fig. 14 is a section taken on line 14—14 of Fig. 12.

Fig. 15 is a section taken on line 15—15 of Fig. 13.

Fig. 16 is an end view looking in the direction of the arrows 16 of Fig. 13, of the guide means for the transfer slide.

Fig. 17 is an end view looking in the direction of the arrows 17 of Fig. 13, of the transfer slide.

Fig. 18 is a fragmentary section taken on line 18—18 of Figs. 13.

Fig. 19 is a horizontal fragmentary sectional view taken on line 19—19 of Fig. 12.

Fig. 20 is a fragmentary vertical sectional view of a railroad car having a container thereon, showing the container lock in locked position.

Fig. 21 is a plan view of the lock and supporting rail of the railroad car, which are shown in Fig. 20.

Fig. 22 is a fragmentary sectional view taken on line 22—22 of Fig. 20.

Fig. 23 is a fragmentary top or plan view of the supporting rail shown in Fig. 22.

Fig. 24 is a fragmentary sectional view like the right portion of Fig. 20, showing the lock in released position.

Referring to Fig. 1 there is shown a railroad flat car 30 having a plurality of transverse, supporting rails 31 on which is supported a pair of containers 32 such as milk tanks or the like. The containers 32 may be of different constructions, one construction being shown in my Patent No. 2,259,319 above referred to.

In Figs. 9 and 10 the tank 32 is shown as having along its bottom skid rails 33 of channel section, said rails being inverted and being slidably carried on the support rails 31. As shown in Fig. 1, a number of the supporting rails 31 may have associated with them novel locking devices 34 provided by the invention, by which the tank or container 32 is secured in place and prevented from having lateral movement. The construction of the locking devices 34 will be set forth in detail below.

Referring to Figs. 2 and 3, there is shown a trailer truck 35 having a trailer chassis 36 and a frame 37 adapted to carry the container 32. The trailer frame 37, Fig. 3, has supporting rails 38 and bridge rails 39 engageable with the inverted-channel skid rails 33 of the container 32 for supporting the same in operative position on the trailer.

In accordance with the present invention the trailer frame 37 is provided with improved transfer means, indicated generally by the numeral 40, by which the container 32 may be transferred from the railroad car 30 to the trailer quickly, reliably and efficiently and with but a single or unidirectional movement of the transfer mechanism. This improved means is in contradistinction to the means of my Patent No. 2,348,019 referred to above, wherein three different and distinct movements of the transfer mechanism are required to effect complete transfer of the container from its supporting means to the vehicle.

The improved transfer means of this invention comprises essentially guide means on the trailer, elongate slide members movable in said guide means transversely of the trailer and driving members movable on the slides and in the same direction as the latter but at different rates. By such organization I am enabled to project the slides from the sides of the vehicle with the drive members at the projected ends of the slides, then link the drive members to the container, and thereafter shift the drive members and slides across the trailer to the opposite side whereupon the drive members will be at the opposite ends of the slides with the slides projecting from the said opposite side of the trailer. Concurrently with such movement the container will have been transferred completely on to the trailer in its proper position for travel, and such transfer will have been effected quickly, safely, and with but a single, unidirectional movement of the slide and driving members.

Referring to Figs. 11 through 16 showing the transfer mechanism which has been generally designated by the numeral 40 in Fig. 3, the guides 41 which are carried by the trailer comprise a pair of formed, shallow metal channels 42 each set on one side flange 42a, the channels being secured together by strips 43 and by the trailer frame 44. The upper flanges 45 of the channels 42 have upturned edges 46, and within the guides 41 slide members or bars 47 are provided, comprising shallow channels 48 set on their sides and having bottom flanges 49 secured together by strips 50, see Fig. 17. The slides 47 closely slidingly fit within the guides 41, as shown in Figs. 14 and 15, and have upper flanges 51 provided with upturned edges 52, said edges fitting against the upturned edges 4 and providing an elongate, longitudinal passage 53, Fig. 15, for a driving member now to be described.

In accordance with the invention the slide 47 is provided with a driving member 54 which is movable longitudinally of the slide, said member comprising a pair of triangular shaped plates 55 secured together by a short pin 56 and having a pair of pins 57 joined to sprocket chains 58. The chin 58 rides in a track comprising a channel member 59 having outturned flanges 60 secured to the top flanges 51 of the slide 47, Fig. 14.

The chains 58 pass around sprockets 61, Figs. 11 and 19, rotatably carried on stationary shafts 62 the ends 63 of which have oppositely disposed flats carried in slots 64 of U-shaped fittings 65 which are welded to the channels 48 of the slide. From the sprockets 61 the chains 58 pass to anchorages 66 and 67 carried by the guide 41, the anchorages 67 being adjustable and comprising bell cranks 68, Figs. 12 and 18, which are adjustably positioned by set screws 69.

Each of the sprockets 61 is integral with a pair of sprockets 70 which flank the opposite sides of the sprocket 61 and are preferably of smaller diameter than said sprocket. The sprockets 70 are thus also rotatably carried by the shafts 62. As shown in Fig. 12, chains 71 are secured to the anchorages 66 and 67, the latter anchorage having bell cranks 72 adjusted by set screws 73. The chains 71 pass over the sprockets 70 and pass over idler sprockets 74, Figs. 13 and 15, which are carried on shafts 75 rotatable in bearing fittings 76 secured to a housing 77 which is attached to the center portion of the slide 41 and depends therefrom. From the sprockets 74 the chains 71 pass over driving sprockets 78, Fig. 14, rotatable on a stationary shaft 79 carried by the housing 77. The sprockets 78 are integral with a spur gear 80 also rotatable on the shaft 79, the gear 80 meshing with a pinion 81, Figs. 11–13, carried on a drive shaft 82, see also Fig. 4, which is driven by means of a speed reducer 83 from an electric motor 84. The motor 84 may be powered from a generator (not shown) driven from the power take-off shaft of the trailer truck, said power drive being conventional and therefore not shown or described herein.

The housing 77 may have a bottom wall 85 and be formed to hold oil for lubrication purposes, as is well understood.

From the above construction it will be seen that rotation of the gear 80 and sprockets 78 will cause the chains 71 to travel around the sprockets 70 and past the sprockets 78, thereby shifting the slide 47 longitudinally in the guide 41 in either one direction or the other, depending on the direction of rotation of the sprockets 78 and gear 80.

By virtue of said movement of the chains 71 and the accompanying rotation of the sprockets 70 as the slide 47 is caused to travel longitudinally, the chains 58 will travel over the sprockets 61 to cause the driving member 54 to shift longitudinally of the slide 47 and in the same direction as the slide, and also at a faster rate of speed. The faster speed is obtained because the sprockets 70 are preferably made of smaller diameter than the sprockets 61.

With the above construction, I accomplish a novel result, that of projecting the slide 47 from one side or the other of the vehicle and at the same time causing the drive member 54 to be disposed at the projected end of the slide. By virtue of this, I am enabled to effect a complete transfer of the container 32 by a single unidirectional movement of the slide 47 and drive member 54.

To illustrate this, reference is had to Figs. 11, 12 and 13. In Fig. 11 the slide 47 is shown in its normal, centralized position in the guide 41, and the drive member 54 is centralized between the ends of the slide 47. When the central drive sprockets 78 are rotated clockwise as viewed in Figs. 11 and 12 and as indicated by the arrow in Fig. 12, they will effect a shifting of the slide 47 to the left at a predetermined rate of speed and will also effect a shifting of the drive member 54 to the left at a faster speed. Therefore, the drive member will overtake the slide, and when the slide is in its extreme leftmost position as shown in Fig. 12 the drive member 54 will be located at the left or projected end of the slide. If, from the positions of Fig. 11, the driving sprockets 78 are turned counterclockwise as indicated by the arrow in Fig. 13, the slide 47 will be shifted to the right as viewed in this figure, together with the drive member 56. It will now be apparent that, with the slide 47 and driving member 54 in the position of Fig. 12, the counterclockwise rotation of the sprocket 78 and the left-to-right movements of the slide 47 and drive member 54 may be utilized to completely shift the container 32 onto the trailer frame.

In Fig. 12 the container 32 is shown as being connected to the drive member 54 by a connecting bar or link 87 having a hooked end 88 engageable with the container 32 and having a second hooked end 89 engageable with the pin 56 of the drive member 54. The end 89 is preferably formed to provide a double hook whereby the bar or link 87 may be used both for pulling and pushing. Accordingly, as illustrated in Figs. 12 and 13, it may be utilized to transfer the container 32 from the railroad car 30 onto the trailer frame 37, or it may be used to remove the container 32 from the trailer frame. For this latter operation, the parts are started in the positions shown in Fig. 13, and the sprockets 78 rotated clockwise until the positions shown in Fig. 12 are attained. During such turning of the sprockets the container 32 will be discharged from the trailer.

It will be noted that with this structure I have provided a novel and effective transfer apparatus by which a container may be either placed on the trailer frame 37 or removed therefrom easily, quickly and effectively, in each case the transfer being accomplished with but a single unidirectional movement of the slide 47 and drive member 54.

The guide 41 and slide 47 are seen to be of rigid and sturdy construction and light weight, and the driving force is imparted thereto by strong and rugged sprocket chains which are known for their load-carrying capacity. The chains which actuate the slide 47 and the drive member 54 pass over strong and sturdy sprockets carried on short heavy shafts in sturdy bearings, and thus they are adapted to withstand powerful forces such as are encountered when a filled container is being transferred.

Also, in accordance with the invention, I provide a novel and improved locking mechanism in conjunction with the railroad car 30. As shown in Figs. 20 and 24 the car 30 has stake pockets 91, said pockets having outwardly offset outer walls 92 at their top portions, constituting abutments, as will be shortly brought out, the offset walls providing recesses within the pockets 91. The pockets 91 are carried on side sills 93 of the car 30, and secured to said sills are trunnions 94, Figs. 21 and 24, rotatably carrying a shaft 95 having affixed to it an operating handle 96 receivable in a yoke 97 which is apertured to accommodate the usual type of sealing wire. The shaft 95 carries a locking dog or finger 98 which is rigidly affixed to it. Rotatably carried by the shaft is a locking arm or lever 99 having side plates 100 and a yoke 101, the plates 100 being generally of triangular shape, and loosely receiving the shaft 95. Pivotally carried between the side plates 100 is an abutment member or arm 102, said member normally hanging pendant as shown in Fig. 24 when the locking mechanism is in released position. The locking arm 99 may be swung upward or counterclockwise from the position of Fig. 24 to the position of Fig. 20, wherein the yoke 100 is in an obstructing position with respect to the container 32, and said arm may be maintained in this position by swinging the abutment arm 102 against the offset portion 92 of the stake pocket into the recess provided by said portion. The locking finger 98 is maintained in a raised position during such movement of the parts. This finger is now swung downward or clockwise to the position shown in Fig. 20 wherein it engages the abutment arm 102 and prevents the latter from being shifted out of its locking and abutting position. For such position of the locking finger 98, the handle 96 is in horizontal position as shown, wherein it may be sealed by passing a suitable sealing wire through the yoke 97.

When the locking mechanism is in released position, as shown in Fig. 24, the locking finger 98 and the handle 96 may also be in horizontal position wherein they may be sealed. Thus the locking mechanism may be sealed either in its locking or its releasing positions, and when it is locked the abutment effected between the offset portion 92 of the stake pocket 91 and the abutment arm 102 is positively maintained, effecting a positive locking of the container. The parts of the container locking mechanism described above are few, simple, economically produceable, and strong and rugged, thereby insuring reliable operation over an extended period of time and under severe and adverse conditions of use.

I also provide by the present invention a novel and improved means for locking the container 32 in travelling position on the trailer frame 37, said means being cooperable to also provide a bridging connection between the trailer and the railroad car whereby an intermediate support is had for the container during its transfer.

Referring to Figs. 5 and 7, the trailer frame 37 has longitudinal rails 104 provided with gusset plates 105 to which are secured the support rail 38. At its extremities the support rail 38 has pins 106 carrying U-shaped locking arms or members 107, the latter comprising side arms 108 and yoke portions 109. Also secured to the extremities of the support rail 38 are angle iron rub rails 109, said rub rails being located below the pins 106 and being engageable by the side arms 108 of the locking member 107 when the latter is in horizontal position as shown in the left portion of Fig. 5.

When the locking member is in this position it is adapted to support one end of a connecting bridge member 110, the other end of which is supported by the laterally offset portion 92 of the stake pocket 91 of the railroad car. The bridge member 110 preferably has a plurality of notches 111 to adjustably locate it on the lip of the offset portion 92, and has an elongate notch 112 receiving the yoke 109 of the locking member 108, to adjustably position the bridge on said locking member.

Thus variations in the spacing between the trailer and the railroad car may be accommodated by the bridge member 110. The upper end portions 113 of the bridge member 110 are rounded so that they do not cause an obstruction to passage of the container 32 from the railroad car to the trailer and vice versa during the transfer operation.

For the purpose of locking the member 108 in upright position as shown in the right portion of Fig. 5, the member has lugs 114 extending in opposite directions to the arms 108. Cooperable with the lugs 114 are locking dogs 115 actuated by handles 116 carried on a shaft 117 passing through the bridge rail 38. The locking dogs 115 and handles 116 are, in effect, like bell cranks. When the locking member 108 is vertical and the handles 116 are extending vertically downward, the locking dogs 115 abut the lugs 114 and prevent clockwise releasing movement of the locking member.

Means are provided to limit longitudinal movement of the container 32 on the railroad car 30. As shown in Figs. 22 and 23, the rails 31 which support the container are provided by spacers 118 which reduce the clearance between the heads of the rails and the supporting channels 33 of the container. The ends 119 of the spacers 118 are tapered so as to not obstruct the skid rail channels 33 of the container during the transfer operation.

Variations and modifications may be made within the scope of the claims, and portions of the improvements may be used without others.

I claim:

1. In freight container transfer equipment for a vehicle, the combination comprising guide means mounted on the vehicle; an elongate slide reversibly movable in said guide means laterally of the vehicle between extreme positions respectively at the opposite sides of the vehicle; a drive member movable longitudinally on said slide between fixed limits; means interconnecting said slide and drive member for simultaneous movement at different rates, said means causing the slide to be positioned at one side or the other of the vehicle in response to completed movement of the drive member along said slide in one direction or the other, respectively, to one of its limits of movement; a power drive connected to said interconnecting means, said interconnecting means comprising a chain carrying the drive member and sprockets mounted adjacent the ends of the slide, said chain passing over said sprockets and at its ends being anchored to the slide at points removed from the ends of the slide; a drive shaft having a sprocket, said power drive comprising additional sprockets alongside and turning with the sprockets adjacent the ends of the slide; a second chain which passes over the sprocket on the drive shaft and the said additional sprockets, the ends of said chain being anchored to the slide at points removed from the ends of the slide.

2. The invention as defined in claim 1 in which the drive shaft and sprocket carried thereby are located below the slide, in which the slide is hollow, and in which there are idler sprockets located within the slide, having fixed locations with respect to the said guide means, said second chain passing around said idler sprockets.

3. The invention as defined in claim 2, in which the drive shaft has a gear, in which there is a driving pinion engaging said gear, and in which there is a casing enclosing and having oil for lubricating said gear and pinion.

4. In freight container transfer equipment for a vehicle, the combination comprising guide means mounted on the vehicle; an elongate slide reversibly movable in said guide means laterally of the vehicle between extreme positions respectively at the opposite sides of the vehicle; a drive member movable longitudinally on said slide between fixed limits; means interconnecting said slide and drive member for simultaneous movement at different rates, said means causing the slide to be positioned at one side or the other of the vehicle in response to completed movement of the drive member along said slide in one direction or the other, respectively, to one of its limits of movement; a power drive connected to said interconnecting means, said interconnecting means comprising a chain carrying the drive member and sprockets mounted adjacent the ends of the slide, said chain passing over said sprockets and at its ends being anchored to the slide at points removed from the ends of the slide; a drive shaft having a pair of sprockets, said power drive comprising additional pairs of sprockets alongside, straddling and turning with the sprockets adjacent the ends of the slide; a pair of chains passing over the said pairs of sprockets, the ends of said chains being anchored to the slide at points removed from the ends of the slide.

5. In freight container transfer equipment for a vehicle, the combination comprising guide means mounted on the vehicle; an elongate slide reversibly movable in said guide means laterally of the vehicle between extreme positions respectively at the opposite sides of the vehicle; a drive member movable longitudinally on said slide between fixed limits; means interconnecting said slide and drive member for simultaneous movement at different rates, said means causing the slide to be positioned at one side or the other of the vehicle in response to completed movement of the drive member along said slide in one direction or the other, respectively, to one of its limits of movement; a power drive connected to said interconnecting means, said interconnecting means comprising a chain carrying the drive member and sprockets mounted adjacent the ends of the slide, said chain passing over said sprockets and at its ends being anchored to the slide at points removed from the ends of the slide; and adjustable means securing the anchored end of the chain to the slide, to adjust the amount of tension of the chain.

References Cited in the file of this patent

UNITED STATES PATENTS

| | | |
|---|---|---|
| 2,304,116 | Fitch et al. | Dec. 8, 1942 |
| 2,348,019 | Norbom | May 2, 1944 |
| 2,352,129 | Shonnard | June 20, 1944 |
| 2,427,603 | Higgins | Sept. 16, 1947 |
| 2,538,531 | Likens | Jan. 16, 1951 |
| 2,591,153 | Hodges | Apr. 1, 1952 |
| 2,685,260 | Auger | Aug. 3, 1954 |
| 2,699,878 | Avery | Jan. 18, 1955 |